(12) United States Patent
Borrett et al.

(10) Patent No.: US 6,477,568 B2
(45) Date of Patent: *Nov. 5, 2002

(54) MANIPULATION OF TRAIL ROUTES RESULTING FROM CHANGES IN NETWORK TOPOLOGY OR OPERATIONAL NEED

(75) Inventors: Richard Stephen Borrett, St Albans; Mark Uniacke, Hatfield, both of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,095

(22) Filed: Nov. 16, 1998

(65) Prior Publication Data
US 2002/0019862 A1 Feb. 14, 2002

(30) Foreign Application Priority Data
Oct. 6, 1998 (GB) .............................................. 9821688

(51) Int. Cl.[7] .............................................. G06F 13/00
(52) U.S. Cl. ...................................... 709/223; 709/220
(58) Field of Search ................................ 709/229, 221, 709/220, 225, 250, 200, 238, 241, 223, 202

(56) References Cited

U.S. PATENT DOCUMENTS

| | | | | |
|---|---|---|---|---|
| 6,009,466 A | * | 12/1999 | Axberg et al. ............... | 709/220 |
| 6,055,568 A | * | 4/2000 | Adams ........................ | 709/221 |
| 6,058,250 A | * | 5/2000 | Harwood et al. ....... | 395/200.57 |
| 6,078,946 A | * | 6/2000 | Johnson ...................... | 709/200 |
| 6,137,804 A | * | 10/2000 | Alison et al. ............... | 370/410 |
| 6,189,025 B1 | * | 2/2001 | Ogura et al. ................ | 709/203 |
| 6,223,219 B1 | * | 4/2001 | Uniacke et al. ............ | 709/220 |

* cited by examiner

Primary Examiner—David Wiley
(74) Attorney, Agent, or Firm—Lee, Mann, Smith, McWilliams, Sweeney & Ohlson

(57) ABSTRACT

A network management system in a communications network comprises a managed object base having a plurality of managed objects describing individual resources of the network; a detection means for detecting changes for configuration of the network; a route finding means for generating data describing a set of routes of trails across said network, and a trail manipulation means for implementing changes to trails across the network. The trail manipulation means operates in four basic modes of operation, including a stretch operation in which a new node is inserted between first and second existing nodes and an existing trail between the first and second existing node is rerouted by the new node by creation of a pair of new links; Firstly, a stretch operation in which a new node is inserted between first and second existing nodes and an existing trail between the first and second existing node is re-routed via the new node by creation of a pair of new links. Secondly, a split operation in which a single trail extending between first and second nodes over at least one intermediate node is split into a plurality of trails. Thirdly, a shrink operation in which a trail extending between first and second nodes via at least one intermediate node is rerouted to extend directly between the first and second nodes, avoiding the intermediate node. Fourthly, a join operation in which first and second trails extending between a first node and an intermediate node, and the intermediate node and a second node respectively are joined at the intermediate node to form a single trail extending between the first and second nodes via the intermediate node.

19 Claims, 19 Drawing Sheets

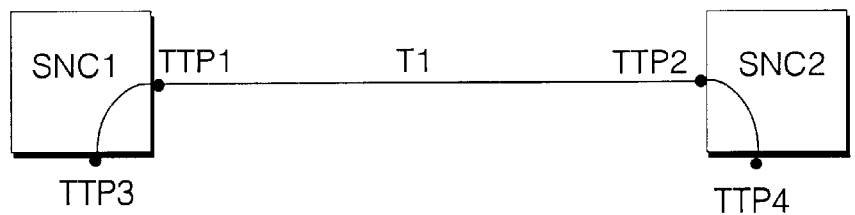
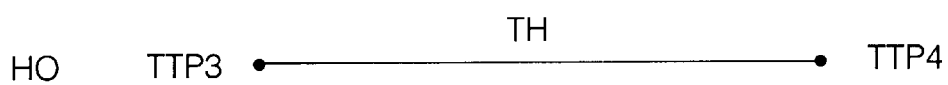
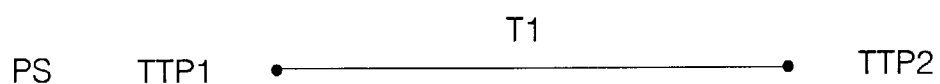
Fig. 3

Before

After

Before

After

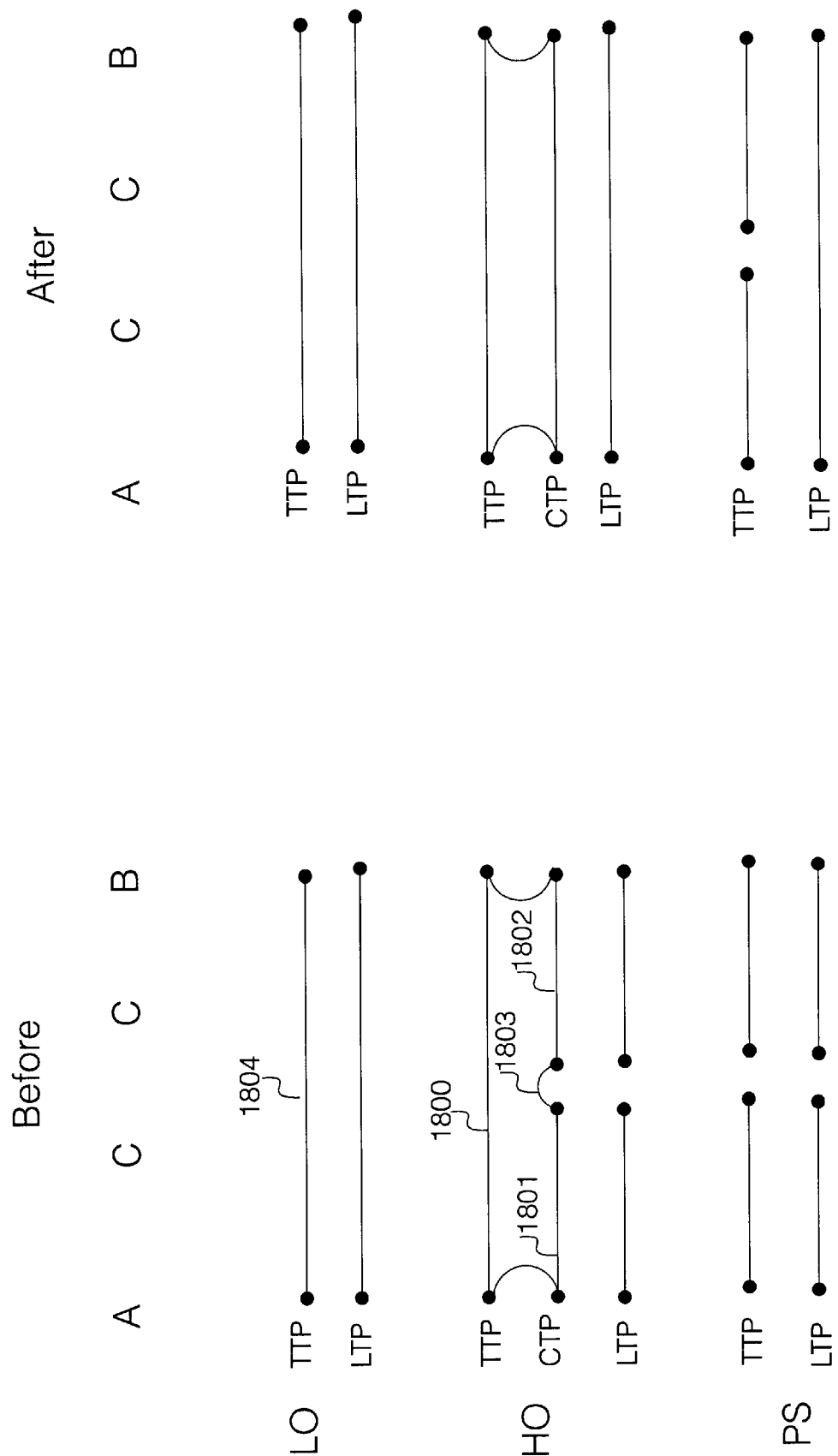

Before

After

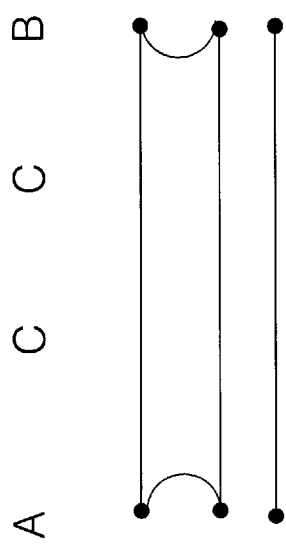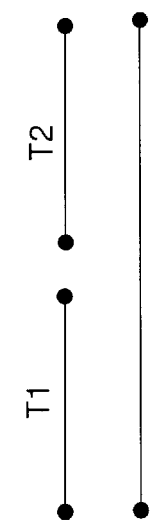
Fig. 25
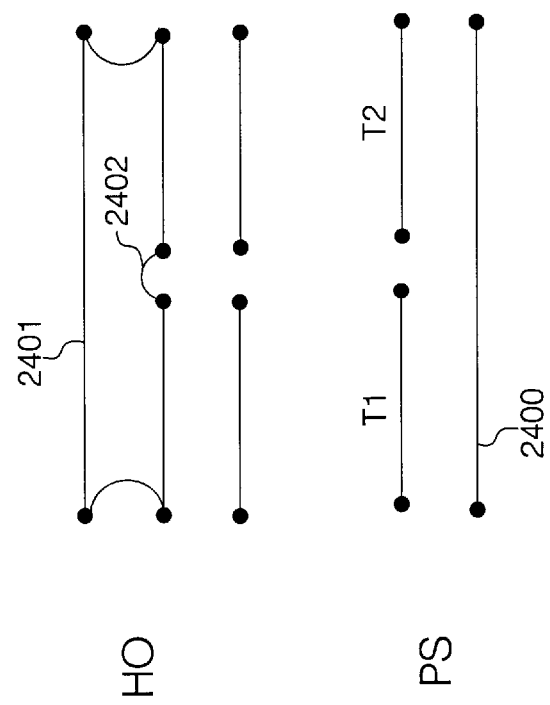
Fig. 24

MANIPULATION OF TRAIL ROUTES RESULTING FROM CHANGES IN NETWORK TOPOLOGY OR OPERATIONAL NEED

FIELD OF THE INVENTION

The present invention relates to network management in communications networks and particularly, although not exclusively, to manipulation and reconfiguration of routes taken by trails in a communications network.

BACKGROUND TO THE INVENTION

In the applicant's co-pending US patent application entitled "Detection of Network Topology Changes Affecting Trail Routing Consistency" filed concurrently with the present application, there is disclosed a method and apparatus for detecting client layer trails which become unsupported due to reconfiguration of a communications network at a server layer, or proposed reconfiguration of a network at a server layer. Modification of physical or logical links in a network affect one or more client trails dependent upon those links for their existence and functioning. There is also disclosed a method and apparatus for finding alternative routes for unsupported client layer trails resulting from topological changes to server layer links. Detection and routing algorithms operate on information maintained in a managed object database subject of the applicant's co-pending U.S. patent application Ser. No. 09/010387 filed at the US Patent Office on Jan. 20, 1998 and entitled "Capability Modeling Using Templates in Network Management System", the contents of which are incorporated herein, and in which a managed object database representing individual physical and logical resources of a network is automatically updated to reflect actual changes to the physical resources which occur in a network by transmission of compressed data over an operation administration and maintenance (OAM) channel to a centralized or distributed network controller.

Changes to network resources which result in client trails becoming unsupported, or proposed new trails being in conflict with existing trails result in a detection algorithm operating to set a state of an instance of an affected physical or logical resource to a set of states including an "inconsistent" state, an "in conflict" state, and a "deleted supporting" state, which are described in the applicant's co-pending U.S. patent application Ser. No. 09/014742 entitled "State Machine for Trail Management System" filed at the US Patent Office on Jan. 20, 1998, the contents of which are incorporated herein.

Although the above disclosures provide a mechanism for automatically receiving data describing changes to a network and updating a managed object database, and for detecting changes to a network and generating data describing proposed re-routing of trails, the above disclosures do not go as far as actual implementation of new routes of trails and manipulation of trails resulting from changes in network topology or operational requirements.

SUMMARY OF THE INVENTION

One object of the present invention is to automatically implement re-routing of trails in a communications network, in particular re-routing which becomes necessary or desirable as a result of topological changes to a network, for example addition or deletion of a node entity.

According to a first aspect of the present invention there is provided a method of reconfiguring a plurality of trails in a network comprising a plurality of network resources, said method comprising the steps of:

storing a plurality of objects representing individual ones of said network resources;

for each said object representing a trail across said network, modifying a set of pointers of said trail object to point to a plurality of other said objects representing endpoints, connections and network elements, for defining said trail; and reconfiguring said network resources in accordance with said trail object for implementing said trail in said network.

Said trail may be implemented in said network by adding or removing said trail, re routing said trail or partially removing or adding said trail.

Said step of altering said pointers of said trail object to a plurality of end points may comprise altering pointers to point to a set of sub-network connections which connect connection termination points and trail termination points and/or to a set of link connections which connect connection termination points.

According to a second aspect of the present invention there is provided a method of reconfiguring a trail extending over a plurality of network elements in a communications network, to incorporate a further network element in said trail, said method may comprise the steps of:

creating a first endpoint at said further network element;

creating a second endpoint at said further network element;

creating a sub-network connection between said first endpoint and said second endpoint at said further network element;

connecting a first link from a first of said plurality of network elements to said further network element; and connecting a second link between a second one of said plurality of network elements and said further network element:

According to a third aspect of the present invention there is provided a method of reconfiguring trails in a network, wherein and after said reconfiguration, said first trail extends between said first and second network elements and a new trail extends between said third network element and said second network element said method comprising the steps of:

disconnecting a pair of endpoints supporting said first trail at said third network element;

modifying said first trail on said third network element; and creating said new trail between said third network element and said second network element.

Preferably said step of creating a new trail between said second network element and said third network element comprises utilising at least one end point and at least one sub-network connection of said first trail.

Said step of disconnecting a pair of endpoints at said third network element may comprise disconnecting a sub-network connection from a connection termination point.

The method may further comprise the step of for each of a plurality of client layer links supported by said first trail, setting a plurality of corresponding link termination point to said third network element.

The method may further comprise the step of creating a plurality of client layer links extending over said second trail between said third and second network elements.

According to a fourth aspect of the present invention there is provided a method of reconfiguring a trail extending over a plurality of network elements from a state in which said trail extends between a first network element and a second network element via a third network element, to a state in which said trail extends between said first and second network elements without traversing said third network element, said method comprising the steps of:

extending a first link connection initially extending between said first network element and said third network element to extend between said first network element and said second network element;

removing a plurality of end points at said third network element from said trail;

removing a sub-network connection at said third network element from said trail;

removing a link connection between said third network element and said second network element from said trail.

According to a fifth aspect of the present invention there is provided a method of reconfiguring trails extending over a plurality of network elements, wherein in an initial state, first and second trails extend between first and third network elements and third and second network elements respectively, and in a reconfigured state, said first trail extends between said first and second network elements via said third network element, said method comprising the steps of:

making a connection between an endpoint of said first trail at said third network element and an endpoint of said second trail at said second network element; and adding said connection to said third network element.

The method may further comprise the step of removing an endpoint of said first trail at said third network element.

The method may further comprise the step of deleting said second trail between said third node element and said second node element.

A link connection between said third node and said second node to said third trail.

The method may comprise the step of defining a trail termination point for said first trail at said second node.

The method may comprise the step of adding a sub-network connection at is said second node to said first trail.

The method may comprise the step of providing at least one client link between said first node and said second node.

The method may comprise the step of deleting a client link dependent on said second trail between said third and said second nodes.

The invention includes a method of reconfiguration of client trails from a configuration wherein a first client trail extends between first and third nodes and the second client trail extends between said third node and a second node, to provide a reconfiguration in which said first client trail extends directly between said first and second nodes, said method comprising the steps of:

disconnecting said first client trail from said third node;

connecting said first client trail to said second node; and creating a sub-network connection at a server layer of said first and second client trails, between first and second server link connections.

The method may further comprise the steps of removing at least one other un-reconfigured client trail related to the first and/or second client trail.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 3 illustrates schematically a trail between first and second network elements, and a layered representation of client and server layer trails between the network elements;

FIG. 5 illustrates an initial layered representation of trails between first and second network elements of FIG. 4 before a stretch process;

FIG. 6 illustrates schematically a layered representation of physical trails between first—third and third—second network elements after a physical reconfiguration of trails during a stretch process;

FIG. 18 illustrates schematically a layered representation of trails, connections and links between first and third, and third and second network elements before a shrink process;

FIG. 19 illustrates schematically a layered representation of trails, connections and links between first, second and third network elements after a shrink process;

FIG. 24 illustrates schematically a layered representation of trails, connections and links between three individual network elements after a first stage of a join process;

FIG. 25 illustrates schematically a layered representation of trails, link connections and links after a second stage of a join process;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
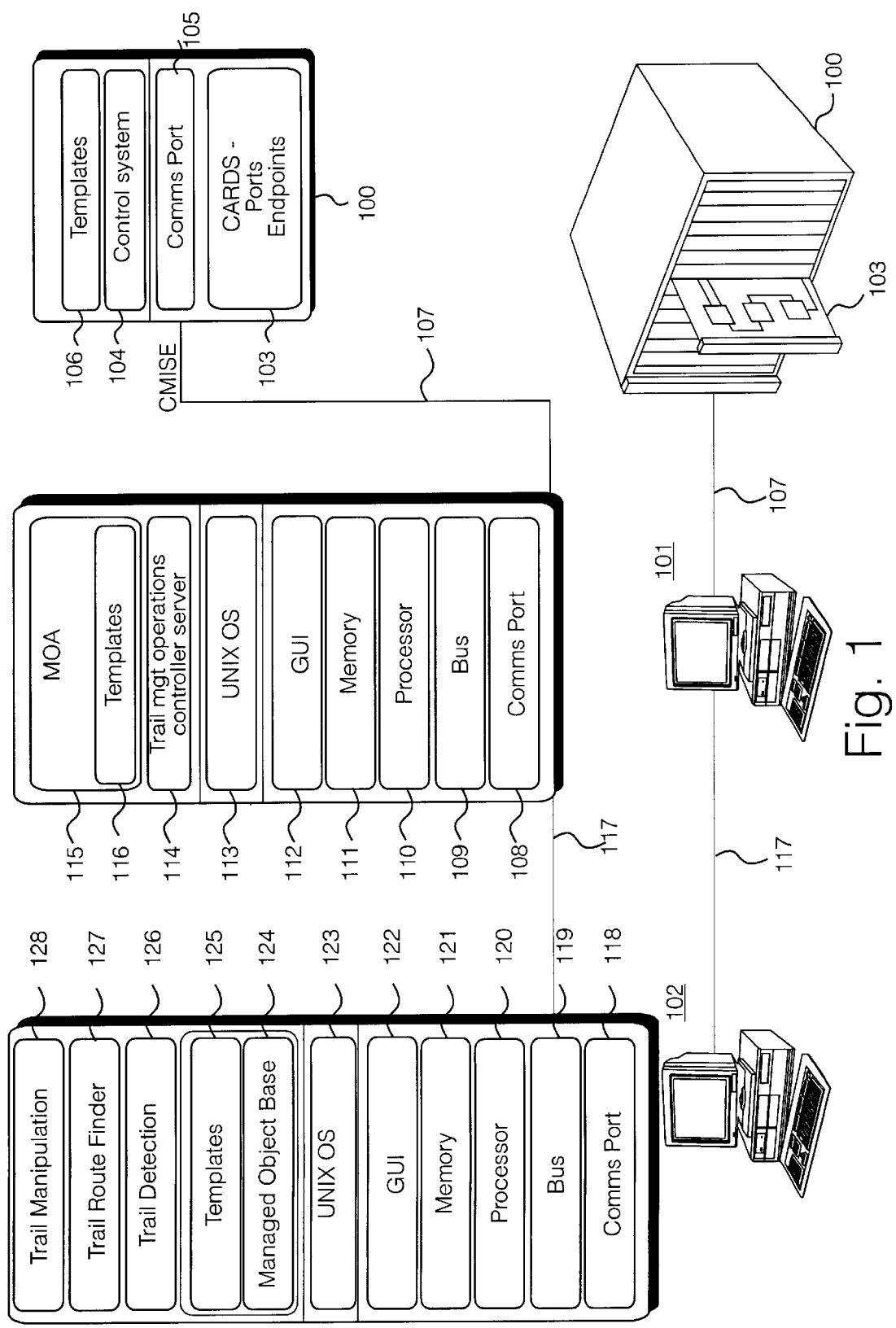
FIG. 1 illustrates schematically a network management system comprising a network controller, a plurality of element controllers, and a plurality of network elements at nodes of the network, controlled by the element controllers and network controller, incorporating a specific embodiment according to the present invention.

Referring to FIG. 1 herein, there is illustrated schematically construction of a network element 100, element controller 101, and network controller 102 in a communications network. The network may comprise a plurality of such network elements controlled by a plurality of element controllers and one or more network controllers. Network element 100, which may be a multiplexer, regenerator, cross connect or the like, comprises a casing or cabinet having a plurality of shelves, each shelf containing a plurality of cards 103. Physical resources of a network comprise components carried on the cards, which include both physical hardware and logical structures within a plurality of network elements. The network element 100 is provided with a local control system 104 and a communications port 105. On reconfiguration of the network element 100, for example by replacement of a card or re-programming of components of a card, the network element may automatically generate operation administration and maintenance signals (OAM signals) which are transmitted to element controller 101 over an OAM channel, for example a conventional CMISE channel. The reconfiguration signals describing the reconfiguration of the network element may be sent in accordance with a set of compressed template signals generated from a template signal generator 106 as described in the applicant's co-pending US patent application U.S. Ser. No. 09/010387"Capability Modeling Using Templates in Network Management System" filed Jan. 28, 1998. By this mechanism, network element 100 notifies element controller 101 of reconfiguration changes to physical and logical resources occurring at the network element automatically.

Similarly, in a reverse direction commands from network controller 102 for logical reconfiguration may be implemented on a large scale on a plurality of network elements by sending reconfiguration signals to a plurality of element controllers 101, each of which control one or a plurality of network elements 100. For simplicity in FIG. 1, only one network element, one element controller and one network controller are shown, however in practice a single network controller may be capable of reconfiguring a large plurality of network elements through a plurality of element controllers. Reconfiguration of network element 100 is by receipt of reconfiguration signals, over OAM channel 107 from the element controller 101. Element controller 101 comprises a communications port 108 for communicating with the network controller and one or a plurality of network elements; an internal bus 109; a data processor 110; a data storage memory 111; a graphical user interface 112, eg a visual display unit and keyboard with pointing device; an operating system 113, for example the known UNIX operating system; a trail management operation control server 114 comprising a plurality of managed objects configured according to the known TMN architecture in accordance with ITU-T recommendation 3010; a managed object agent 115 which operates on the managed objects in the trail management operations control server, the managed object agent operating a set of templates data which match those of the network controller in accordance with reconfiguration instructions received from the network controller 102.

Network controller 102 comprises a communications port 118; an internal bus 119; a data processor 120; a memory 121 associated with the data processor; a graphical user interface 122 by which a network operator can manually enter commands to the network controller and by which the network operator may obtain a visual display comprising a plurality of icons representing individual network elements and element controllers; the data processor, user interface and memory operating in accordance with a known operating system, for example a UNIX operating system 123. Control of the network is achieved by storing a managed object base 124 comprising a plurality of managed objects and instances representing each managed component of a managed communications network comprising the plurality of network elements and element controllers. Managed components comprise individual trails, connections, links, sub-connections, ports, end points and the like which can be reconfigured from the centralized network controller by a set of OAM signals issued from one or more network controllers to the plurality of network elements. The network controller also comprises a plurality of applications including a trail detection application 126, a trail route finder application 127 and a trail manipulation application 128. Operation of the trail detection and trail route finder applications is described in the applicant's co-pending patent application entitled "Detection of Network Topology Changes Affecting Trail Routing Consistency" the contents of which are incorporated herein. Trail detection application 126 detects changes to trails and links within the network automatically by interrogation of managed object base 124, and trail route finder application 127 generates a plurality of route data describing one or more optimum routes across a network following a reconfiguration of a network element, for example an introduction of a network element involving disconnection of one or more physical links and connection and connection of one or more new physical links.

Reconfiguration instructions received from network controller 102 are passed over communications channel 117, for example a TCP-IP link to the managed object agent, in an element controller which operates on the managed objects stored in the trail management operations controller server, the managed objects representing physical and logical resources of one or a plurality of network elements 100. Manipulation of the managed objects by managed object agent 116 results in command signals sent over OAM channel 107 to each network element 100 which results in internal logical reconfiguration of the network elements.

Figure 2:
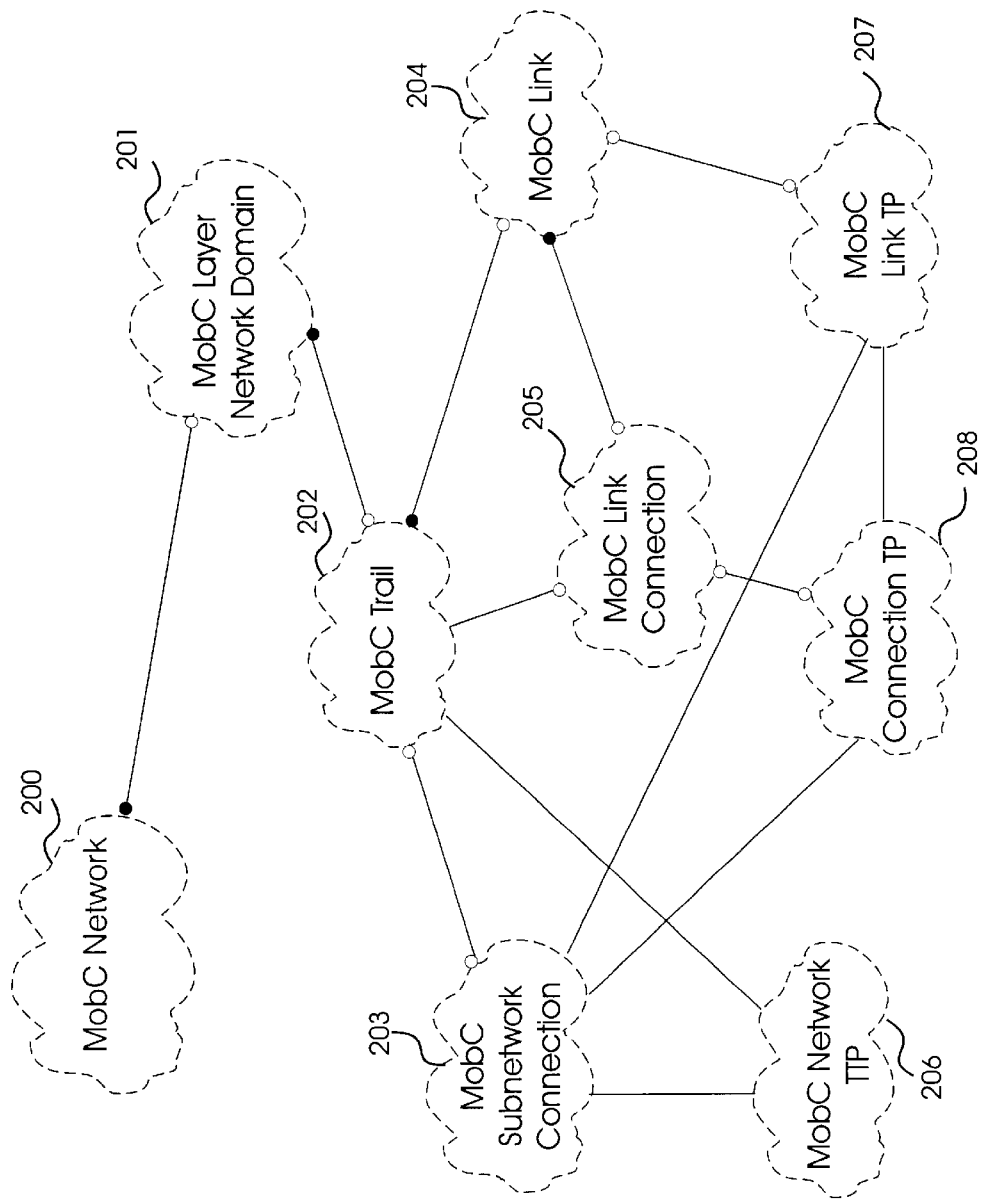
FIG. 2 illustrates schematically an entity relationship diagram describing an architecture of a managed object database upon which processes are performed to implement reconfigurations of node elements according to specific methods of the present invention.

Referring to FIG. 2 herein, there is illustrated an entity relationship diagram describing relationships between a plurality of managed objects representing trails and links across the network under management. The whole managed network is represented by a network object 200. The network contains a plurality of layers, each represented by a layer network domain managed object 201 describing a layer across the whole of the network under management; each layer contains a plurality of trails, each trail represented by a trail managed object 202 each trail comprising a plurality of sub-network connections, each subnetwork connection represented by sub-network connection managed object 203; a plurality of links each represented by a link object 204 the link objects comprising representations of server trails; a plurality of link connections each represented by a link connection object 205 each trail having a plurality of trail termination points represented by a trail termination point object 206; each link comprising a plurality of link termination points each represented by link termination point managed object 207; and each link connection comprising a plurality of connection points, each represented by a connection termination point object 208. Each physical and logical component is represented by a separate instance in the object database.

In this specification the following terms are defined in accordance with ITU-T recommendation G.805 as follows:

The term "link" is defined as a "topological component" which describes a fixed relationship between a "sub-network" or "access group" and another "subnetwork" or "access group". A link consists of a subset of ports at the edge of one sub-network or access group which are associated with a corresponding sub-set of ports at the edge of another sub-network or access group. A link represents a topological relationship and available transport capacity between a pair of sub-networks or between a sub-network and an access group or pair of access groups. Multiple links may exist between any given sub-network and access group or pair of sub-networks or access groups. Links are established or maintained by a server layer network.

A "link connection" is defined as a "transport entity" that transfers information between "ports" across a link. A link connection is capable of transferring information transparently across a link. A link connection is delimited by ports and represents a fixed relationship between the ends of a link. A link connection represents a pair of adaptation functions and a trail in a server layer network.

A "uni-directional port" is defined as representing the output of a trail termination source or uni-directional link connection, or the input to a trail termination sink or unidirectional link connection.

A "port" is defined as consisting of a pair of unidirectional ports.

The term "sub-network connection" is defined as a "transport entity" which transfers information across a sub-network and is formed by the association of "ports" on the boundary of the sub-network.

The term "unidirectional trail" is defined as a "transport entity" responsible for the transfer of information from the input of a trail termination source to the output of a trail termination sink.

The term "trail" is defined as a "transport entity" which consists of an associated pair of unidirectional trails capable of simultaneously transferring information in opposite directions between their respective inputs and outputs.

The term "unidirectional connection" is defined as a "transport entity" which transfers information transparently from input to output.

The term "connection" is defined as a "transport entity" which consists of an associated pair of "uni-directional connections" capable of simultaneously transferring information in opposite directions between their respective inputs and outputs.

The term "endpoint" refers to any termination point terminating a trail, a route, a link or a connection.

According to a specific implementation of the present invention, trail manipulation application 128 communicates with trail route finder application 127 and trail detection application 126 to modify instances representing trails and links extending over a plurality of node entities, also represented in managed object database 124. Modifications to the instances in the managed object database 124 are automatically implemented by means of managed object application 115 at the element controllers 101 which send out OAM signals for reconfiguration of the appropriate network resources at the plurality of network elements 100. Trail manipulator 128 comprises a trail manipulation algorithm operated by processor 120 and memory 121 and interacting with trail route finder 127 and trail detection means 126. Input signals to trail manipulation means 128 may be generated by trail route finder means 127 or trail detection means 126, or alternatively may be input by a human network operator at graphical user interface 122 by means of keyboard data entry, and/or pointing device data entries in conjunction with a visual display of icons representing trails, links and network entities on a visual display device comprising the graphical user interface.

Trail manipulator 128 operates for reconfiguration of trails within the network in response to commands entered by the human network operator via the graphical user interface, or alternatively automatically in response to re-routing commands received from trail route finder means 127.

Trail manipulation means 128 has various modes of operation for creation and deletion of trails within a network. Trail manipulation means 128 performs 4 basic trail manipulation operations as follows:

Firstly, a stretch operation in which a new node is inserted between first and second existing nodes and an existing trail between the first and second existing node is re-routed via the new node by creation of a pair of new links.

Secondly, a split operation in which a single trail extending between first and second nodes over at least one intermediate node is split into a plurality of trails.

Thirdly, a shrink operation in which a trail extending between first and second nodes via at least one intermediate node is rerouted to extend directly between the first and second nodes, avoiding the intermediate node.

Fourthly, a join operation in which first and second trails extending between a first node and an intermediate node, and the intermediate node and a second node respectively are joined at the intermediate node to form a single trail extending between the first and second nodes via the intermediate node.

The stretch and split operations are carried out primarily on introduction of one or more new network elements to a network. The shrink and join operations are carried out primarily on removal of network elements from a network.

There will now be described operations performed by the network controller in performing a stretch operation.

Referring to FIG. 3 herein, there is illustrated schematically first and second network elements represented by first and second node entities marked A, B linked by a first trail T1 between first and second trail termination points TTP1, TTP2 at first and second nodes A, B respectively. In FIG. 3 there is shown a layer representation of trails between first and second nodes A and B at a physical layer PS, a higher order layer HO and a lower order layer LO. Also shown in FIG. 3 are sub-network connections SNC1, SNC2 between first trail termination point on first node A and third trail termination point TTP3 within first node entity A, and second sub-network connection SNC2 between second trail termination point TTP2 and fourth trail termination point TTP4 within a second node entity B.

First trail T1 is represented for simplicity as a physical layer trail schematically in the layer diagram of FIG. 3. In fact, first trail T1 comprises a plurality of trails, having a one to one relationship with each other and including a physical layer trail, an optical layer trail, a regenerator layer trail, and a multiplex section layer trail. Each of these trails are represented schematically as the single first trail T1 at the physical layer in FIG. 3 for ease of explanation. First trail T1 forms a server trail for higher order layer trail, second trail $T_H$ between third trail termination point TTP3 and fourth tail termination point TTP4. For example, higher order layer trail $T_H$ may comprise a VC-4 trail. At a lower order layer, third trail $T_L$ extends between third trail termination point TTP3 and fourth trail termination point TTP4 and is supported by higher order layer trail $T_H$. Lower order layer trail $T_L$ may comprise for example a VC-12 trail. Both higher order layer trail $T_H$ and lower order trail $T_L$ are logical trails. Higher order layer trail $T_H$ comprises a server trail to one or a plurality of lower order trails $T_L$, only one of which is shown in FIG. 3 herein. Similarly, physical layer trail T1 comprises a server layer trail for one or a plurality of higher order layer trails $T_H$.

Figure 4:
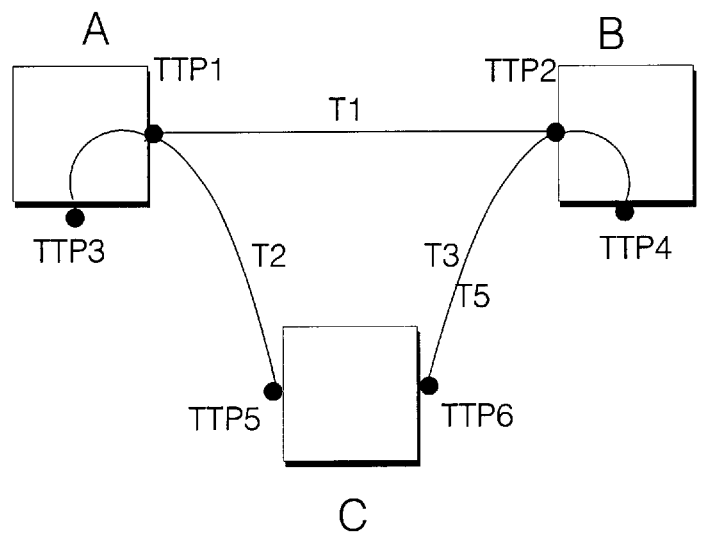
FIG. 4 illustrates schematically a first stage of a stretch process for reconfiguration of a trail between first and second network elements.

Referring to FIG. 4 herein, there is illustrated schematically a first stage of a stretch operation. The purpose of the stretch operation is to bridge the client trails, eg the lower order trails $T_L$ upon introduction of a new node entity C. On introduction of new node C, a new trail T2 is created at the physical layer between first node A and third (new) node C between first trail termination point TTP1 and fifth trail termination point TTP5 of new node C. Similarly, a third trail T3 is created between sixth trail termination point TTP6 on third node C and second trail termination point TTP2 on second node B.

The trails are represented before and after connection of second and third trails T2, T3 at the physical level in FIGS. 5 and 6 herein. The route from nodes A to C to B comprising new trails T2, T3 may be input to trail manipulation algorithm 128 from trail route finder algorithm 127 in the form of a data file identifying nodes and links. The trail manipulation algorithm 128 performs the task of actual creation of those trails by creation of instances of trails within managed object database 124 and by changing state data for existing trail termination points TTP1, TTP2 within the managed object base.

Physical trails at the physical layer form links at the higher order layer. Link connections are built on the links at the higher order layer and a collection of link connections and sub-network connections form a trail at the higher order layer. A trail at the higher order layer forms a link at the lower order layer, upon which a link connection and trail are built at the lower order layer. Links join a pair of link termination points at each end of the link. Link termination points in a client layer are equivalent to trail termination points in a server layer. The link termination points are represented as parent objects in the managed object database, which are capable of allocating one or a plurality of connection termination points (CTPs). A plurality of CTPs need to be connected together to support a client trail. A link is able to provide a plurality of link connections, and thereby support a plurality of trails.

Figure 7:
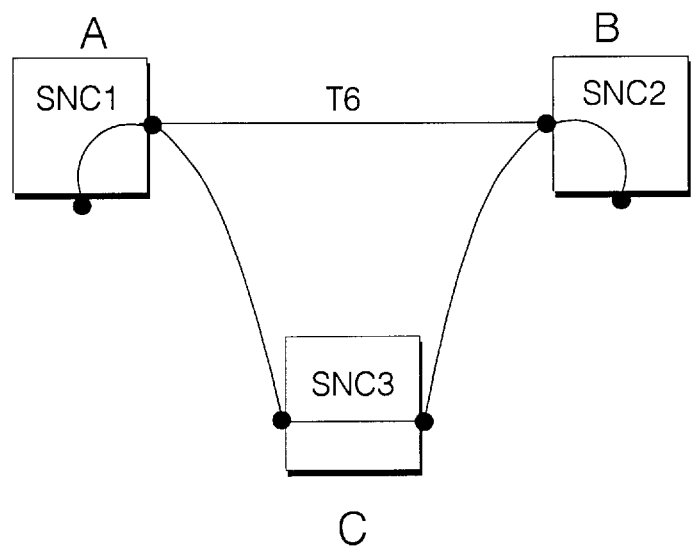
FIG. 7 illustrates schematically a physical and logical representation of trails after a stretch operation.
Figure 8:
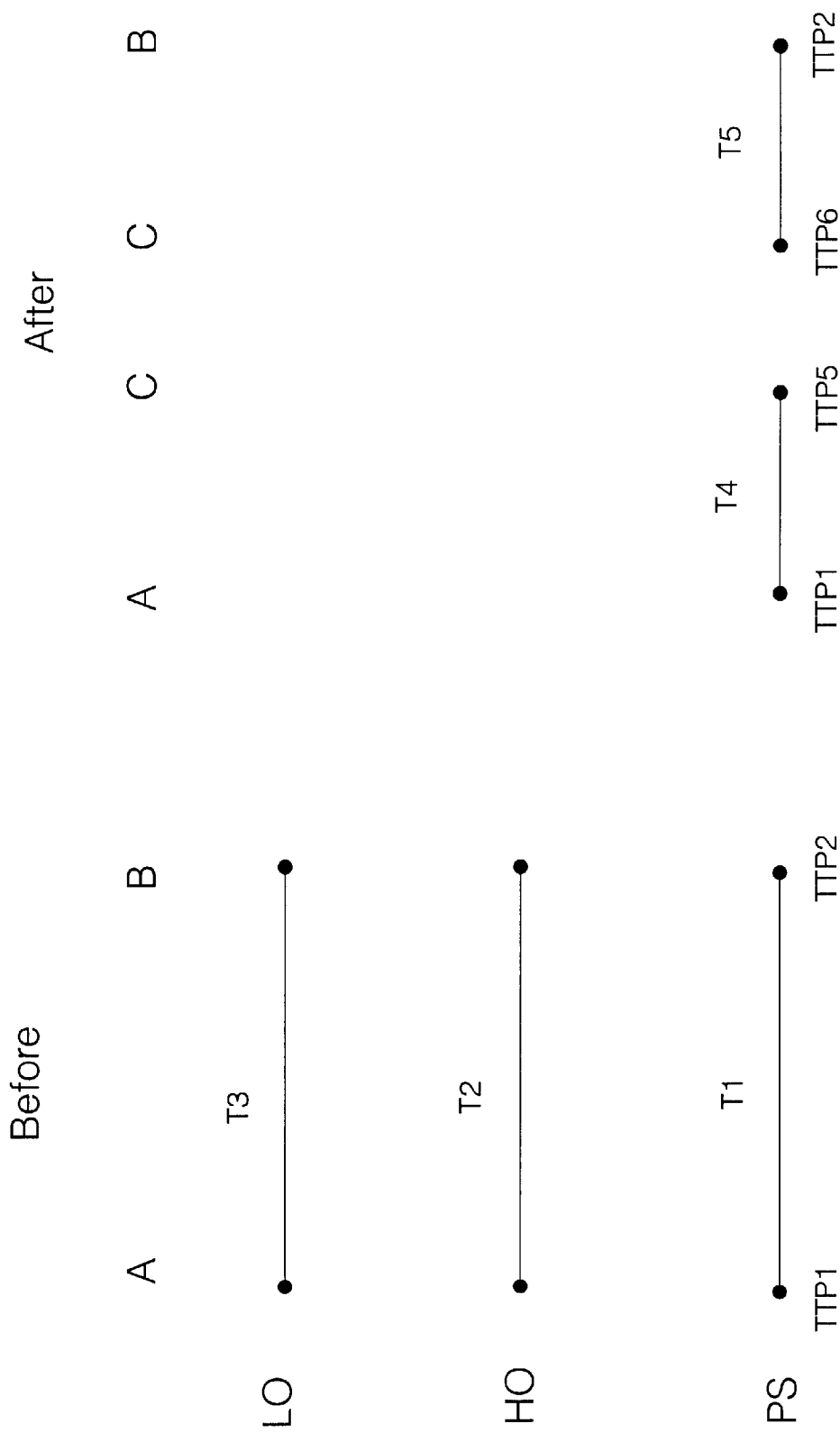
FIG. 8 illustrates schematically a logical layered representation of trails, connections and links between first and second network elements before a stretch process.

Referring to FIG. 7, having established second and third trails T2, T3 at the physical layer, the trail manipulation algorithm creates a complete trail T6 between first node A and second node B via third node C at the higher order layer by creating a sub-network connection SNC3 between fifth and sixth trail termination points TTP5, TTP6 at third node C. The logical and physical layers are shown in FIG. 8 both before and after a stretch operation. In FIG. 7, higher order logical trail T4 is a client trail of first and second physical trails T2, T3.

Whilst physical trails T2, T3 pass through node C, logical trail T4 is shown schematically as connected directly from nodes A to B logically. A single trail T4 at the higher order layer is built upon first and second trails at the physical layer T2, T3, which bridges across new third node C. Connection between fifth and sixth trail termination points TTP5, TTP6 is made via third sub-node connection SNC3 at the higher order layer. First and second trails T2, T3 at the physical layer are equivalent to first and second links 900, 901 at the higher order layer. First and second link connections 902, 903 are carried on first and second links 900, 901 and are bridged by a third sub-network connection SNC3. Fourth trail T4 at the higher order layer comprises first and second link connections 902, 903 and third sub-network connection SNC3. Lower order layer trail $T_L$ is built upon higher order layer trail T4, which provides a lower order layer link 904.

Figure 10:
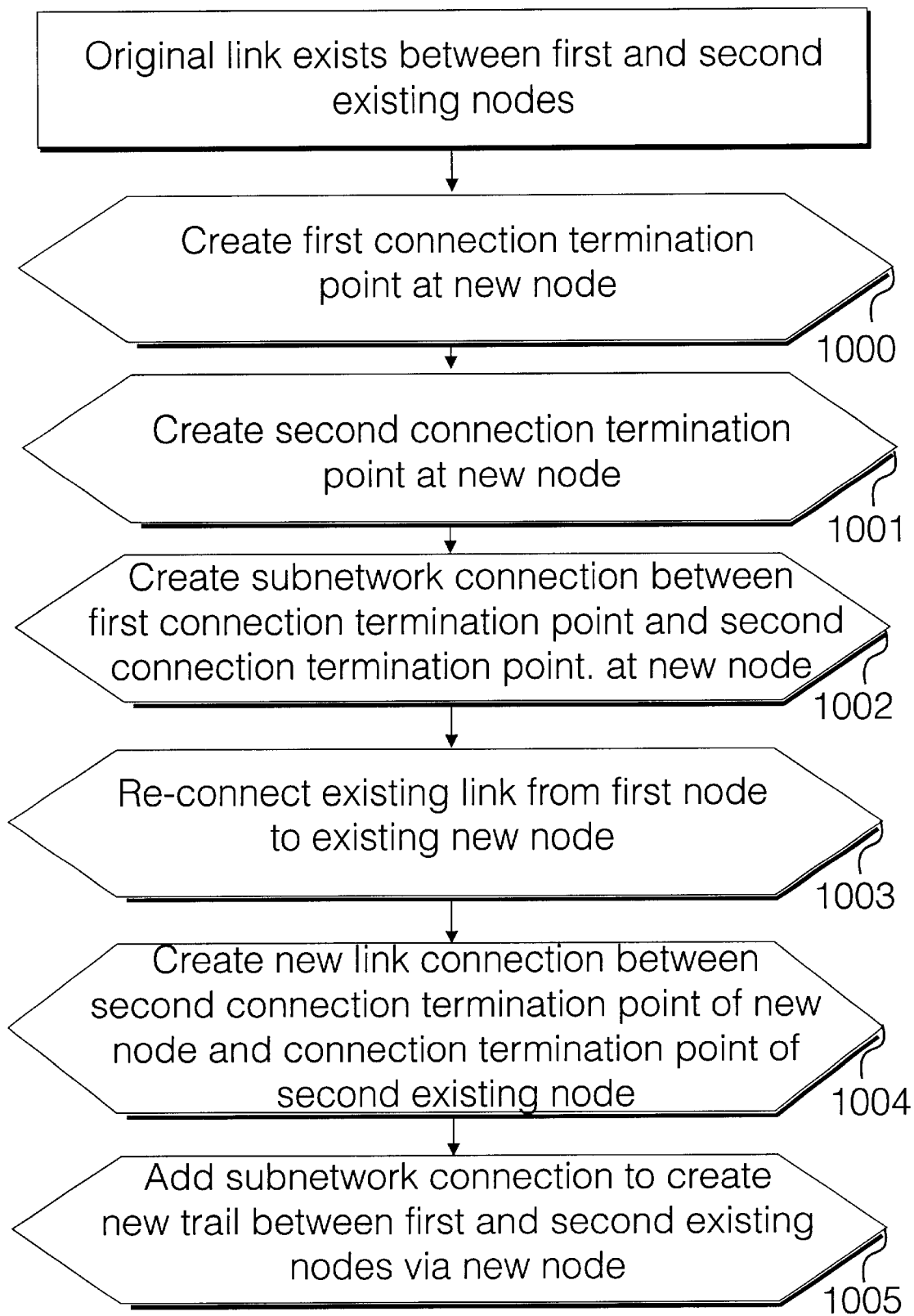
FIG. 10 illustrates schematically process steps carried out by a trail manipulation means for carrying out a stretch process on a trail.

Referring to FIG. 10 herein, there are illustrated schematically process steps carried out by trail manipulation algorithm 128 for replacement of an original link between first and second nodes by a new route of links through a new third node C. In step 1000, at the new node C, a first connection termination point is created at newly introduced node C, and in step 1001 a second connection termination point is created at new node C. In step 1002, a sub-network connection SNC3 between the first connection termination point and the second termination point is created at the new node. The existing link from the first node to the second node is disconnected, and then reconnected to the new node C in step 1003. In step 1004, a new link connection between the second connection termination point of the new node and a connection termination point of the second existing node is created. In step 1005, the sub-network connection is added to the connection termination point at the third node C in order to create a new trail between the first and second existing nodes via new node C.

Figure 9:
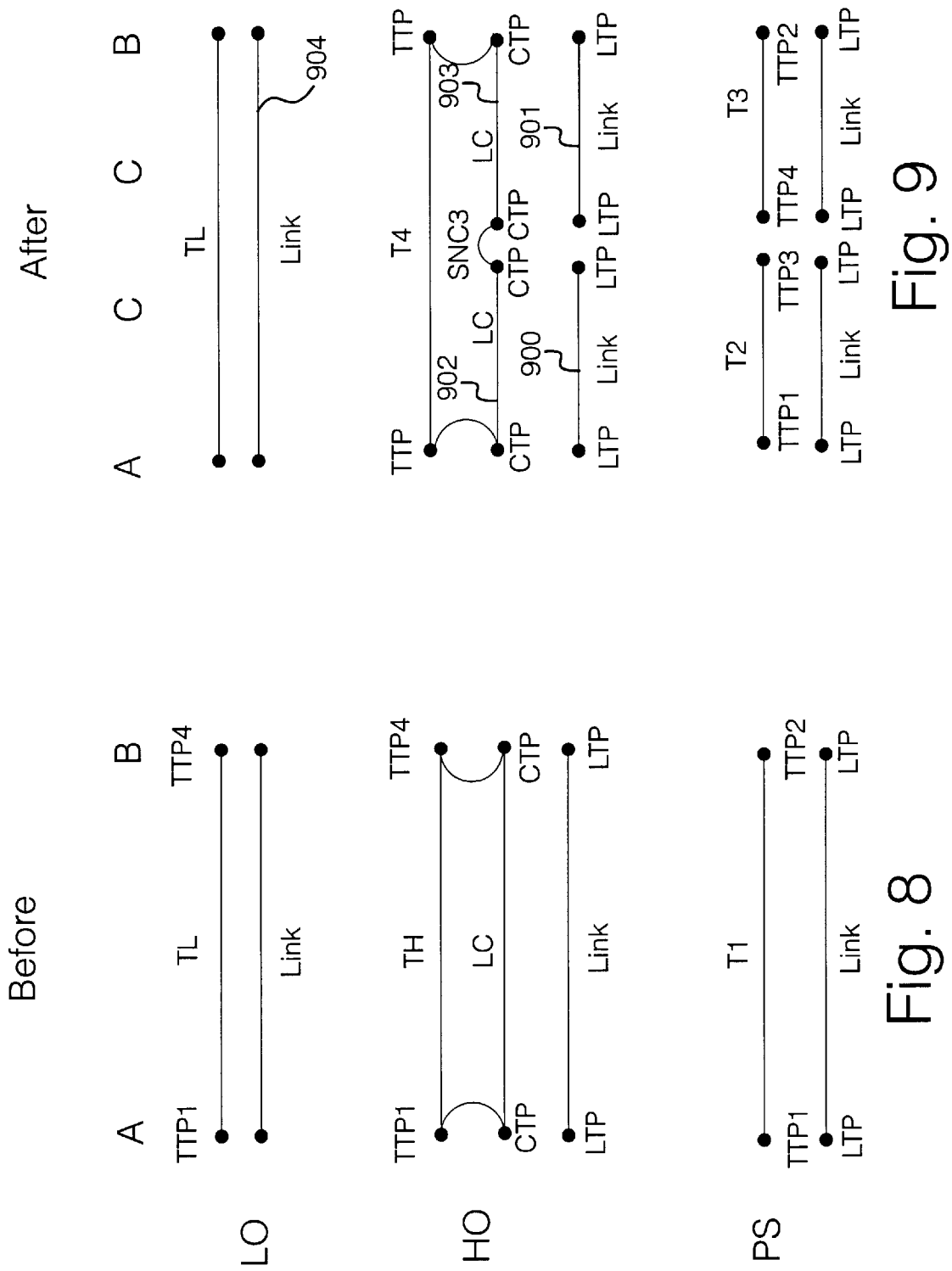
FIG. 9 illustrates schematically a layered representation of trails, connections and links for first, second and third network elements after a stretch process.

In the example of FIGS. 7 to 9, since the new trail T4 created between first and second nodes via new third node C is at the higher order layer, which comprises a server layer for the trail at the lower order layer, no reconfiguration of the lower order trail needs to be made, since logically the new trail T4 at the higher order layer which is a server to lower order layer trail appears equivalent to the previous higher order layer trail $T_H$ directly between first and second nodes A, B.

There will now be described a split operation in which a sub-network connection at a server layer is removed and replaced by a sub-network connection at a client layer.

Figure 11:
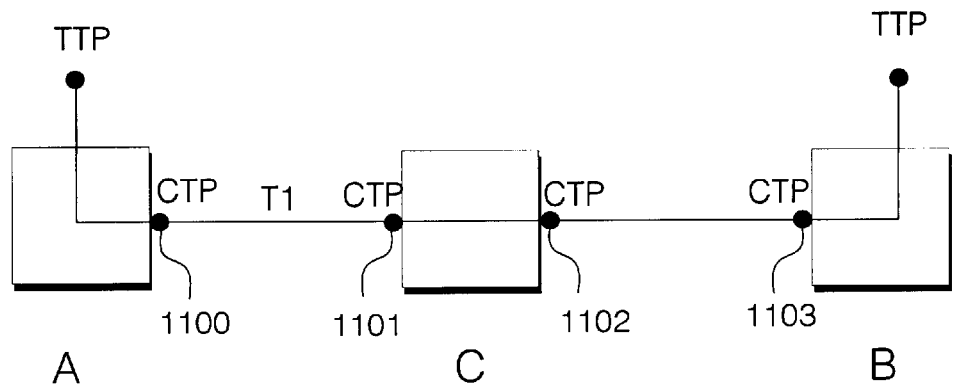
FIG. 11 illustrates schematically a trail between first, second and third network elements before performing a split process on a trail.
Figure 15:
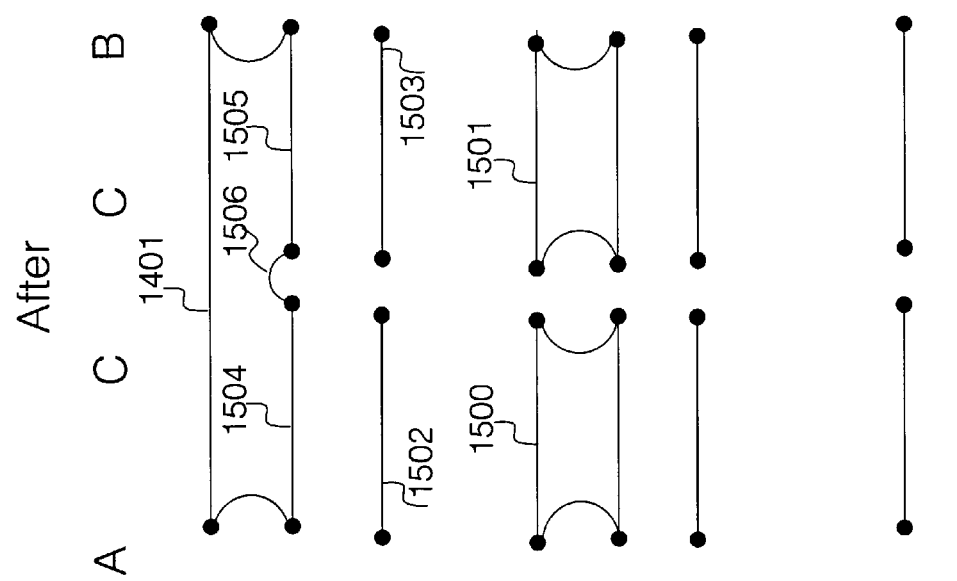
FIG. 15 illustrates schematically a layered representation of trails, connections and links between first, second and third network elements after a split process.

Referring to FIG. 11 herein, there is illustrated a trail T1 existing between a first trail termination point at first node A and a second trail termination point at second node B. Trail T1 passes through a third node C. Trail T1 is illustrated in FIG. 15 before a split operation, in which the trail T1 is terminated at third node C and split into two trails T1, T2 as illustrated with reference to FIG. 12 herein.

Figure 12:
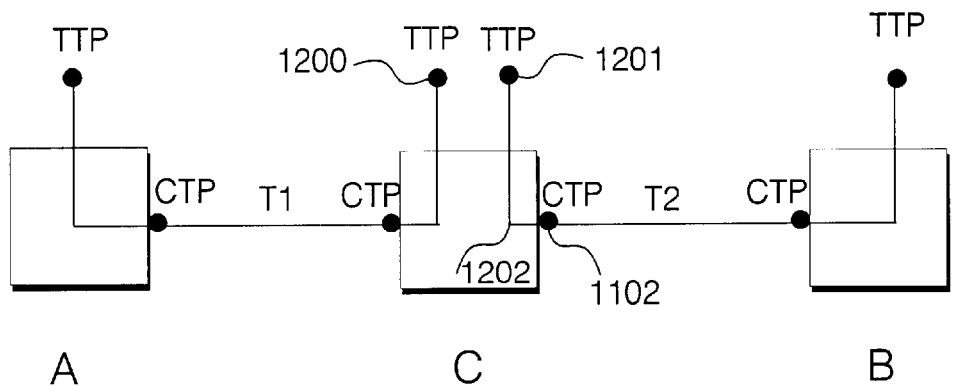
FIG. 12 illustrates schematically first and second trails between first and third network elements and third and second network elements respectively.

Referring to FIG. 12 herein, after a split operation, first trail T1 exists between first trail termination point of first node A and a first trail termination point of third node C, and new trail T2 exists between second trail termination point of third node C and trail termination point of second node B. The original single trail T1 extending between first and second nodes A, B through node C is replaced by two trails T1 between first node A and third node C, and second trail T2 between third node C and second node B. First and second trail T1 and T2 are not connected to each other.

Figure 13A:
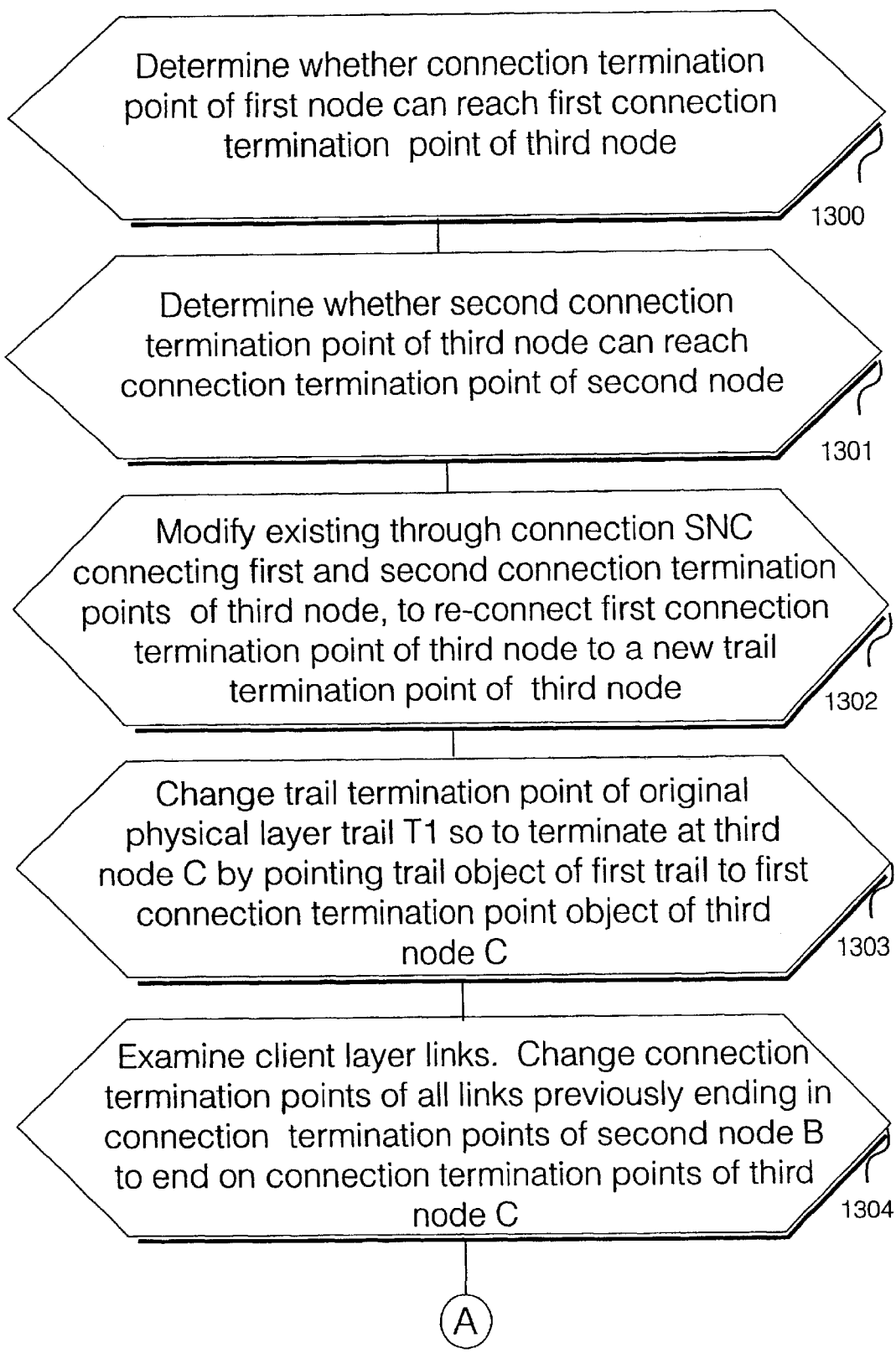
FIGS. 13A and 13B illustrates schematically a set of process steps carried out by a trail manipulation means for performing a split process for splitting a trail.
Figure 13:
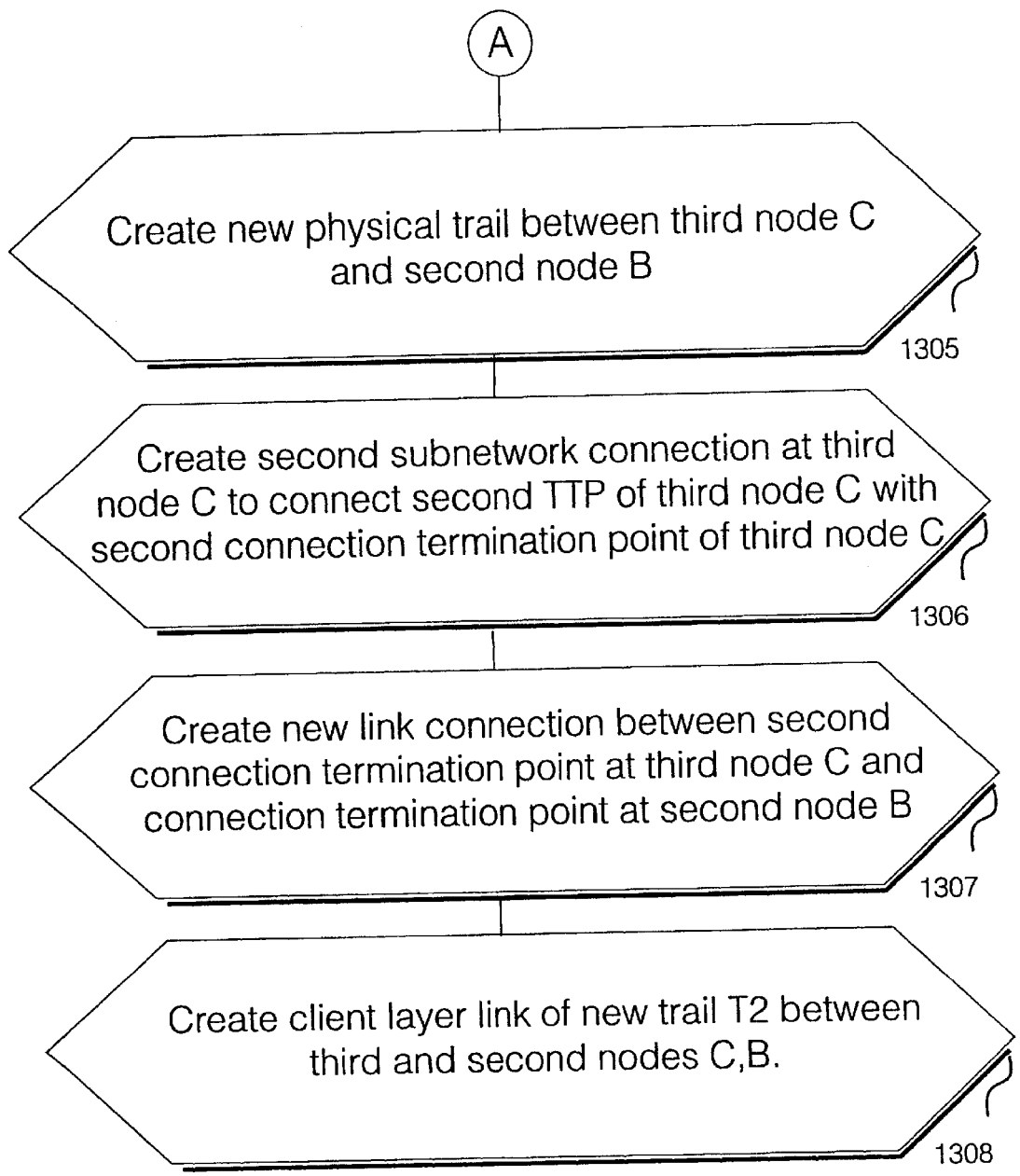

Referring to FIG. 13A herein, there is illustrated schematically process steps carried out by trail manipulation algorithm 128 for performing a split operation on a trail. It will be understood that although three nodes are shown for ease of explanation in FIGS. 11 and 12, there may be many intermediate nodes along the trail. However, the third node C is illustrated as being a node at which a trail is split into two other nodes.

In step 1300, the algorithm determines, by interrogation of the managed object base, whether the connection termination point 1100 of node A can reach first connection termination point 1101 of third node C. In step 1301, the algorithm determines whether the second connection termination point 1102 of third node C can reach the connection termination point 1103 of second node B. In step 1302, sub-network connection of third node C is inspected by the algorithm and is re-directed so that instead of linking first connection termination point 1101 of node C to second connection termination point 1 102 of node C, the sub-network connection connects first connection termination point 1101 of node C to first trail termination point 1300 of third node C. In step 1303, the original trail T1 is changed so as to terminate at the first trail termination point 1300 of third node C by pointing the trail object of the first trail to the first trail termination point object corresponding to first trail termination point 1300 of third node C. At this point, a complete trail T1 exists between first node A and third node C at the server layer (the physical layer). In step 1304, client layers are examined. Each link in the client layer dependent upon the original trail T1 is examined. For any links dependent upon original trail T1, the link termination points of all client links which previously ended on link termination points at second node B are changed to end on link termination points at third node C so as to be consistent with the re-routed trail T1 now ending on third node C. In step 1305, new second trail T2 is created between third node C and second node B. To do this, the algorithm creates a second sub-network connection 1201 at third node C linking a second trail termination point 1202 with second connection termination point 1102 of node C. Original sub-network connection at second node B remains unchanged.

In step 1307, a new link connection is created between second CTP 1102 of third node C and CTP of second node B. In step 1308, there are created a plurality of client links of second trail T2 so that trails at higher client layers can be created based upon links between third node C and second node B. In the split operation, two links are created. The links are used to bridge the client trails to maintain a same end to end consistency of client trails as existed before the split.

Figure 14:
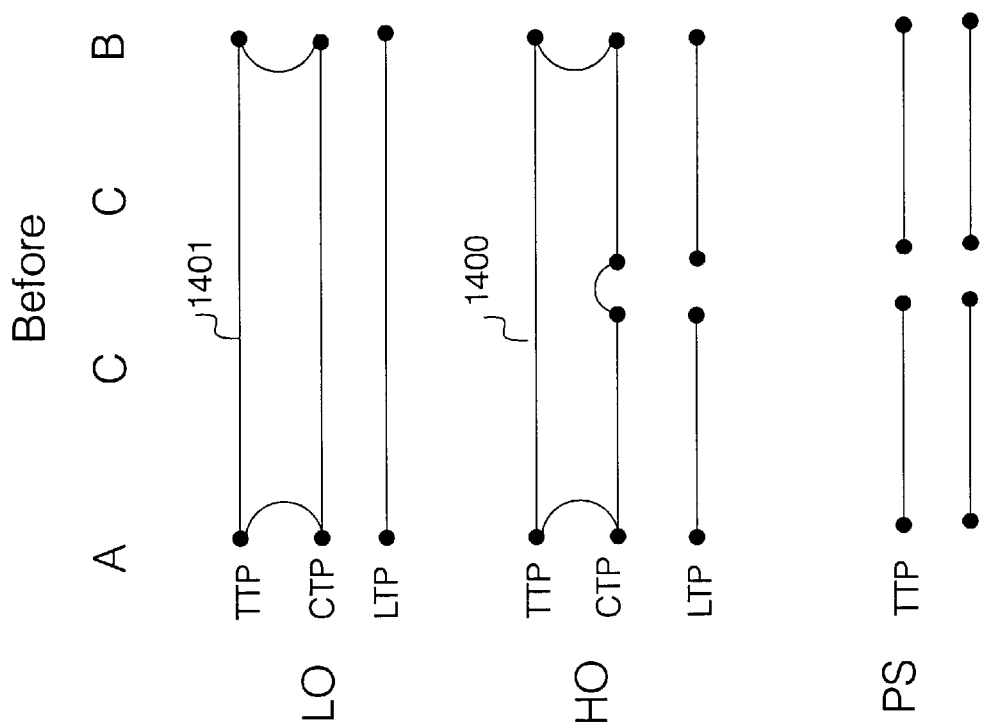
FIG. 14 illustrates schematically a layered representation of trails, connections and links between first and second network elements before a split process.

Referring to FIGS. 14 and 15 herein, there are illustrated the physical layers (server layers) higher order layer and lower order layer both before and after the split operation. Higher order trail 1400 is split into two higher order layer trails 1500, 1501 after the split operation. The first and second higher order layer trails provide first and second lower order layer links 1502, 1503 on which first and second lower order layer link connections 1504, 1505 are based. The lower order link connections are connected together by lower order layer sub-network connection 1506 to provide support for lower order layer trail 1401. No reconfiguration of lower order trail 1401 is necessary after the split operation.

A shrink operation performed by trail manipulation algorithm 128 will now be described.

Figure 16:
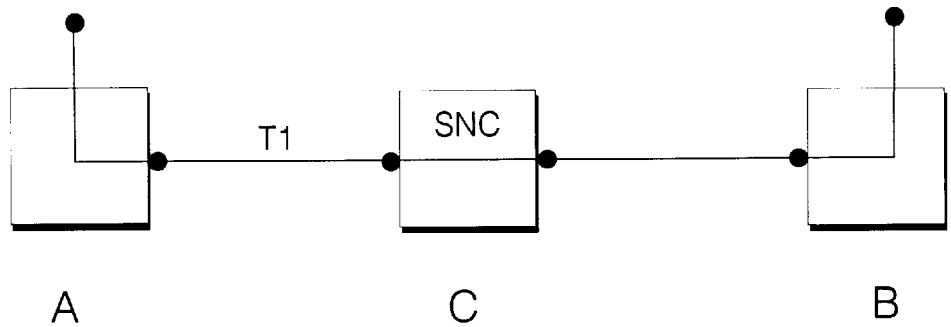
FIG. 16 illustrates schematically a trail between first and second network elements via a third node before a shrink process.
Figure 17:
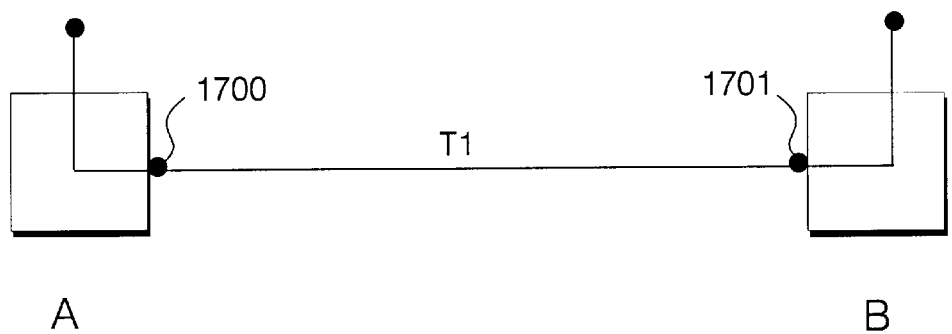
FIG. 17 illustrates schematically a trail between first and second network elements after a shrink process.
Figure 20:
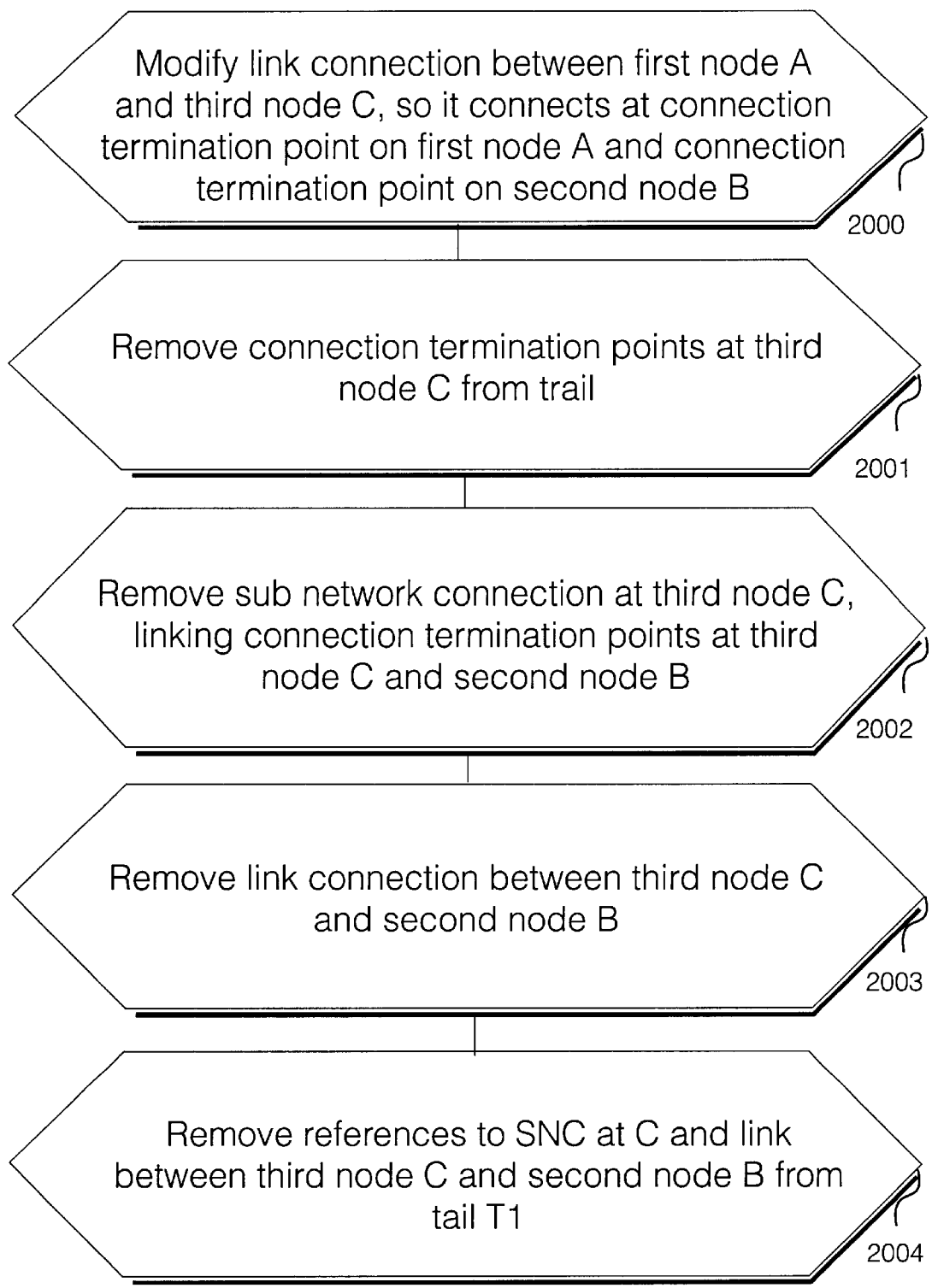
FIG. 20 illustrates schematically process steps carried out by a trail manipulation means for implementing a shrink process.

Referring to FIG. 16 herein, there is illustrated schematically a first trail T1 between a first node A and second node B via third node C before a shrink operation. In FIG. 17, there is illustrated the client trail T1 after a shrink at a server layer, for example a physical layer. The client layer T1 after the shrink extends between first node A and second node B. The corresponding before and after layered trail, link and link connection structures are illustrated schematically in FIGS. 18 and 19 herein, and in FIG. 20 there are illustrated process steps operated by trail manipulation algorithm 128 for performing a shrink operation. Initially before the shrink operation, higher order layer trail 1800 comprises first and second higher order layer link connections, 1801, 1802 respectively connected by a sub-network connection 1803 at third node C. In step 2000, the algorithm modifies the first higher order layer link connection between first node A and third node C so it connects between first connection termination point 1700 of first node A and first connection termination point 1701 of second node B. In step 2001 the connection termination points for the higher order layer link connections at third node C are removed from higher order layer trail 1800. In step 2002, the sub-network connection at third node C linking the connection termination points at third node C are removed from higher order layer trail 1800. In step 2003, second link connection 1802 between third node C and second node B is removed from higher order layer trail 1800. In step 2004, any references to the sub-network connection 1803 at the higher order layer and second link 1802 between third node C and second node B are removed from higher order layer trail 1800. Since the higher order layer trail 1800 still exists in a same logical form as originally, there is no need to modify lower order client layer trails 1804 during this operation.

Figure 21:
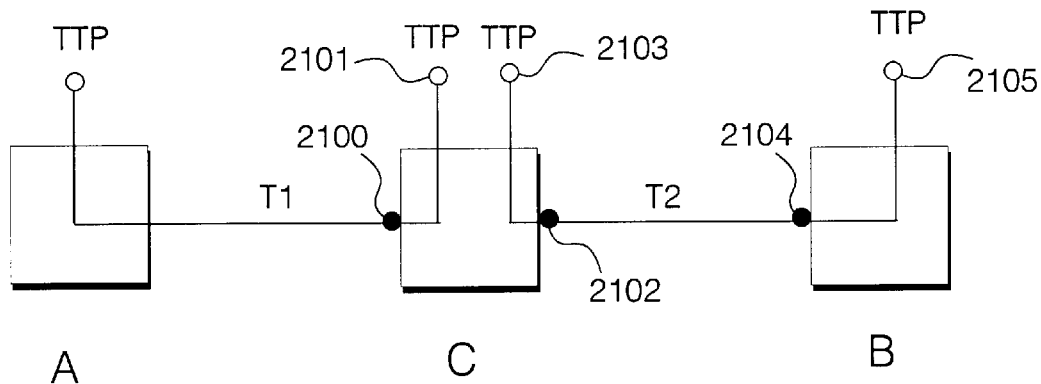
FIG. 21 illustrates schematically a pair of trails between first and third and third and second network elements respectively before a join process.
Figure 22:
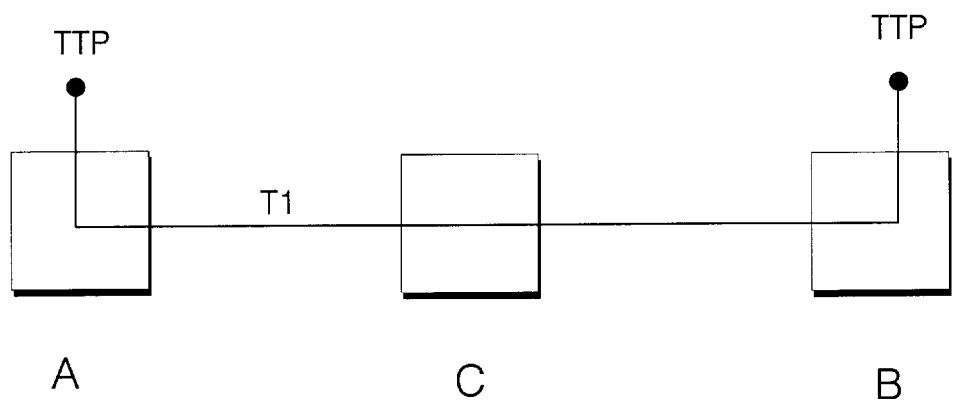
FIG. 22 illustrates schematically a trail between first and second network elements via a third network element after a join process.

There will now be described a join operation for joining first and second trails T1, T2 between first and third nodes A–C and third and second nodes C–B respectively into a single trail between first and second nodes A–B via third node C. Referring to FIG. 21 herein, there is illustrated first and second trails T1, T2 before a join operation and in FIG. 22 herein, there is illustrated schematically single trail T1 after a join operation.

Figure 23:
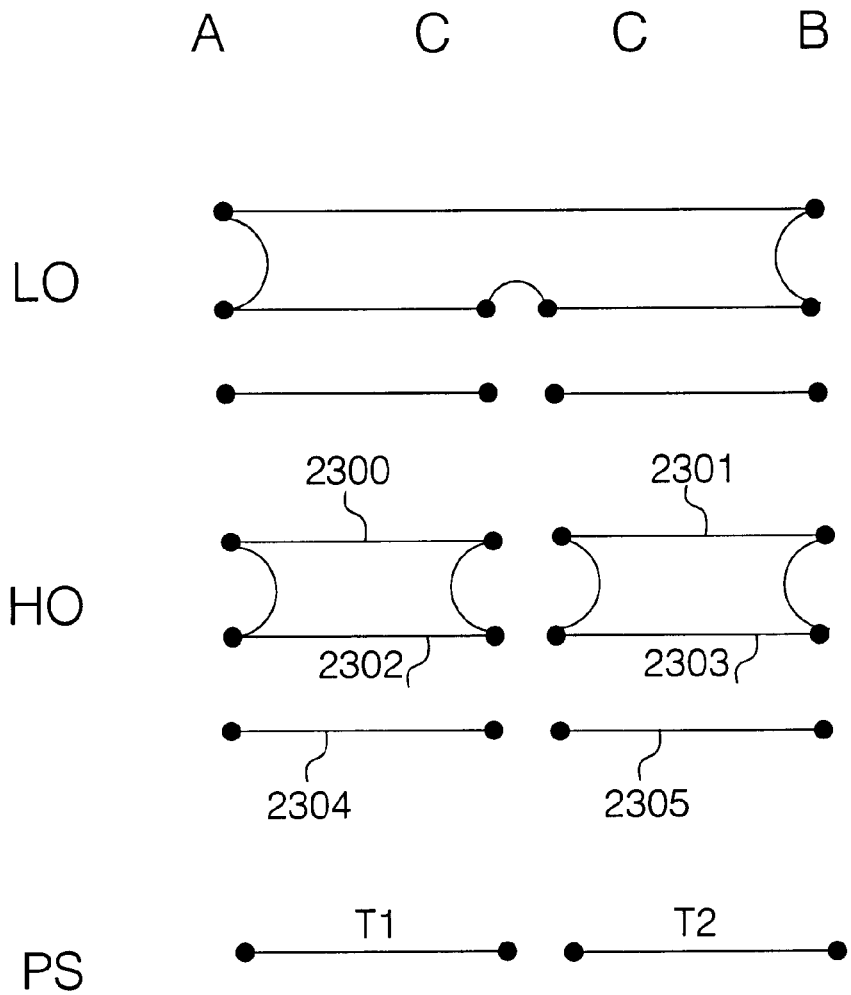
FIG. 23 illustrates schematically a layered representation of trails, connections and links before a join process.
Figure 26:
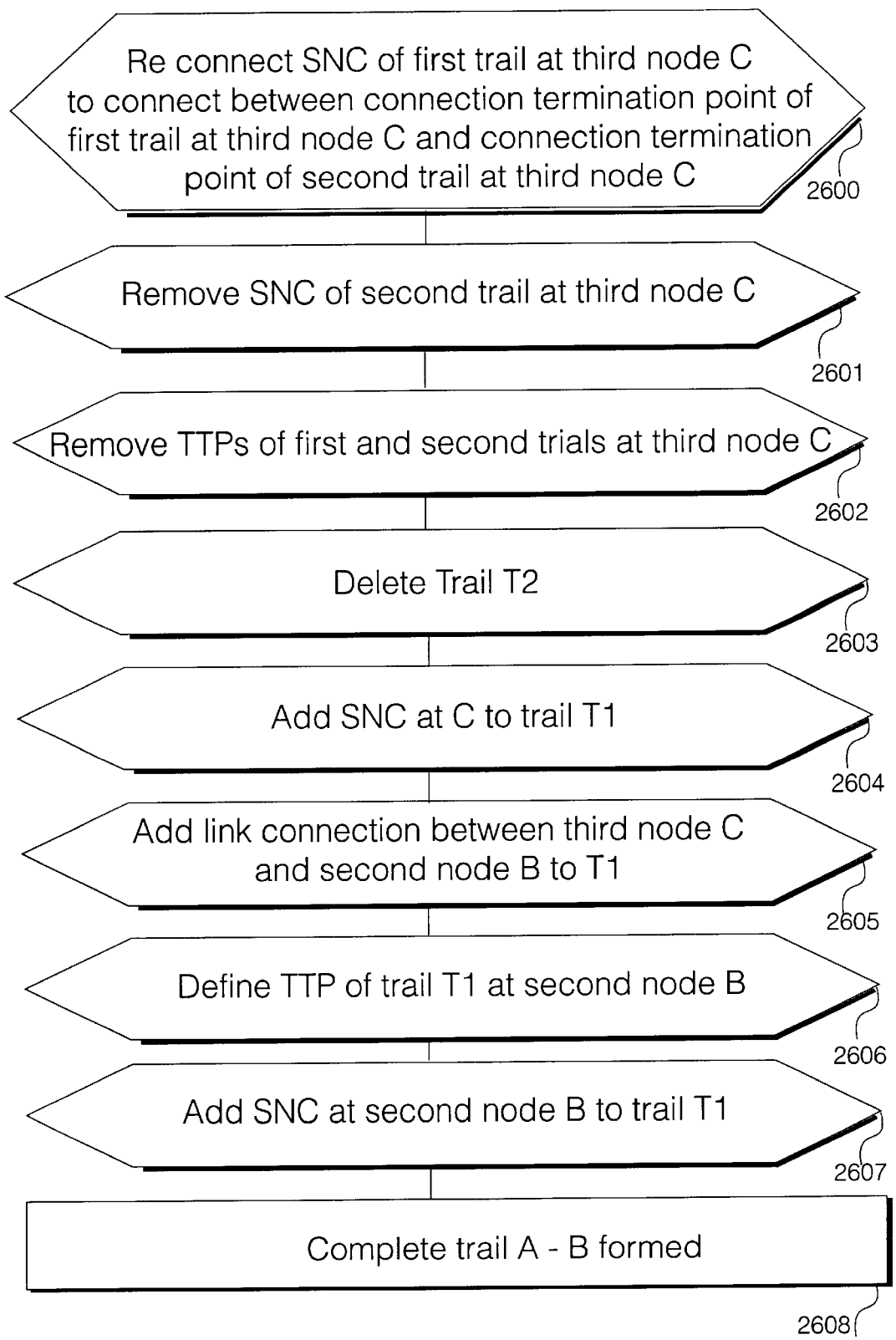
FIG. 26 illustrates schematically process steps carried out by a trail manipulation means for implementing a first stage of a join process.

In FIG. 23, there is illustrated schematically a layer representation of trails, link connections and links before a join operation. In FIG. 24 herein, there is illustrated schematically a layer representation of trails, connections and links after a first stage of the join operation, and in FIG. 25 herein there is illustrated schematically a layer representation of trails, connections and links after the join operation. In FIG. 26 herein, there is illustrated schematically process steps operated by trail manipulation algorithm 128 for performing a first stage of a join operation and in FIG. 27 herein there are illustrated process steps operated by the trail manipulation algorithm 128 for completion of the join operation in a second stage.

Referring to FIGS. 21 and 23 herein, before a join operation, there exist first and second physical trails, T1, T2 and first and second higher order layer trails 2300, 2301 respectively, the higher order layer trails supported by first and second higher order layer link connections 2302, 2303 respectively, supported by first and second higher order layer links 2304, 2305 respectively. In the join operation, third node C is removed, higher order layer link connections 2302 and 2303 between nodes A and B and B and C respectively are removed, and a higher order layer connection between nodes A and B is created. The object of the join operation is to create a new physical layer trail 2400 between first and second nodes A and B, and a new higher order layer trail 2401 between nodes A and B. This is achieved by effectively taking existing first higher order layer trail 2300 between first and third nodes A, C and adapting this to become higher order layer trail 2401 extending between first and second nodes A, B, that is to say re-routing the first higher order layer trail 2300 from termination at third node C to termination at second node B. Higher order layer trail 2401 between first and second nodes relies on a higher order layer sub-network connection 2402 for its creation.

In FIG. 24, there is shown a join between first and second nodes A and B after a first stage in the join operation in which the physical layer and the higher order layer reconfigurations are complete. In FIG. 24, there is shown a single direct physical trail 2400 between first and second nodes A, B but also first and second physical trails T1, T2 from first node A to third node C and from third node C to second node B respectively. At the physical layer, first and second trails T1, T2 via third node C may provide an alternative physical basis to a direct trail between first and second nodes A, B. This allows the flexibility in a join operation of leaving the existing intermediate node physically in place with the physical trails to that node in place but having a logical direct connection between first and second nodes A, B at the higher order layer, or moving third node C completely to have direct physical and higher order layer trails between first and second nodes A, B. In other words, first and second nodes A, B can be joined logically whilst physically supported by third node C, or can directly communicate together both physically and logically.

Referring to FIGS. 21 to 27, in step 2600 a sub-network connection between 10 first connection termination point 2100 at third node C and first trail termination point 2101 at third node C is re-connected to second connection termination point 2102 at third node C. The sub-network connection is re-connected to connect between first connection termination point 2100 of first link connection 2300 at third node C and second connection termination point 2102 of second link connection 2301 at third node C. This sub-network connection becomes a through connection at node C. In step 2601, sub-network connection of second trail T2 between second trail termination point 2103 of third node C and second connection termination point 2102 of third node C is removed. In step 2602 the trail termination points 2101, 2103 are removed from the first and second trails. In step 2603 trail T2 is deleted. In step 2604 the sub-network connection between connection termination points 2100 and 2102 at node C is added to trail T1 by pointing the managed object representing the trail to the object representing the connection termination points. At step 2605 link connection between third node C and second node B is added to trail T1. In step 2607 a sub-network connection at second node B connecting a connection termination point 2104 to trail termination point 2105 at second node B is added to trail T1.

The complete trail between first and second nodes A, B is formed by reconfigured trail T1. The trail termination point and sub-network connection at node B and the link between third node C and second node B are taken over by trail T1 from removed trail T2. This situation corresponds to FIG. 24 after the first stage of the join procedure.

The state of the complete trail after the first stage of the join of FIG. 26 corresponds to the layer diagram in FIG. 24 herein.

Figure 27:
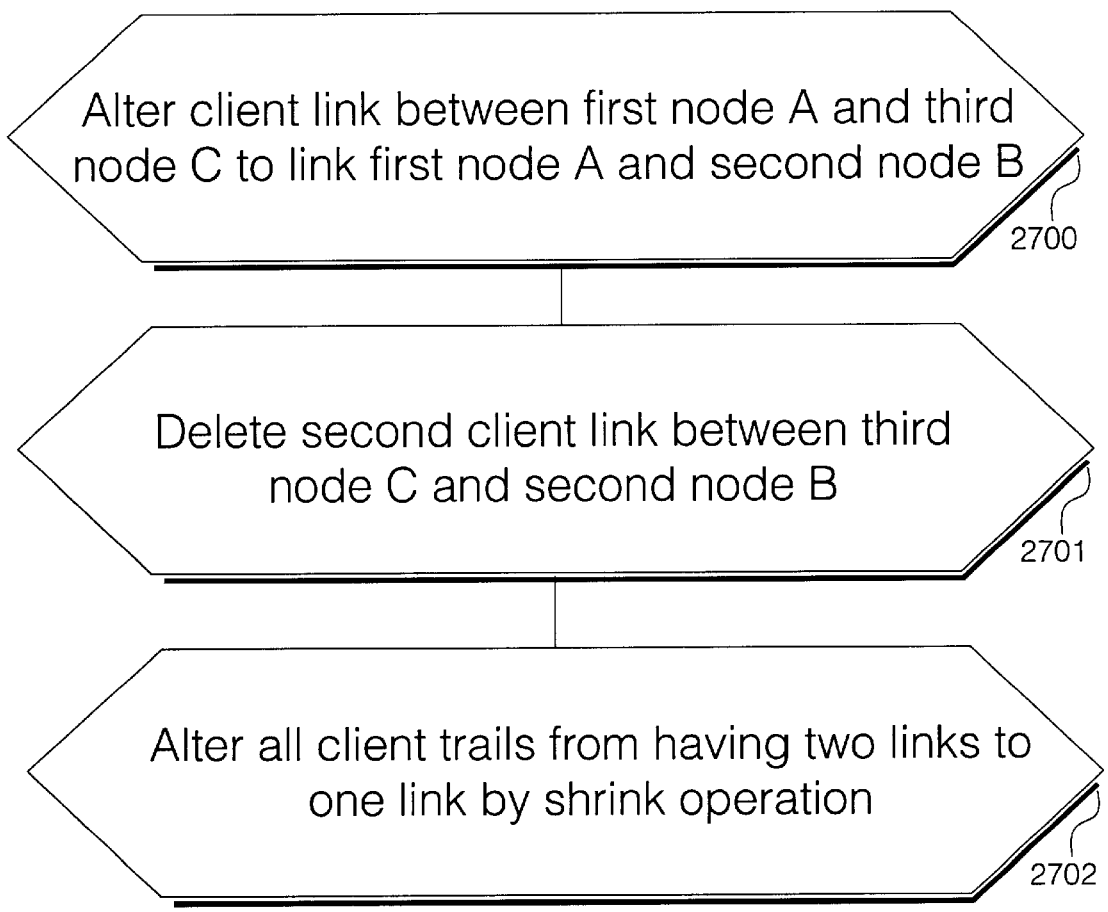
FIG. 27 illustrates schematically process steps carried our by a trail manipulation means for carrying out a second stage of a join process.

Referring to FIG. 27 herein, a second stage of the join procedure is illustrated. In step 2700, client links which were supported by original trails T1 and T2 are altered. A link between first node A and third node C is altered to link between first node A and second node B. A second client link between third node C and second node B which was supported by original trail T2 is deleted in step 2701. In step 2702, all client trails are altered from having two links to having one link by a join operation as described with reference to FIGS. 21 to 27 above.

A join operation provides a reverse operation to a split operation. When a network element is introduced at a node of a network, firstly a stretch operation and then a split operation may be applied. On removal of a network element from a node, a join operation and then a shrink operation may be applied. The combination of the above described operations and processes may give the capability of modifying trails in a network independently of physical topology changes, which may provide a significant operational advantage for networks managed using reconfiguration methods under control of a network management system as disclosed herein.

What is claimed is:

1. A method of manipulating and reconfiguring a plurality of trails in a communications network, each said trail comprising a transport entity capable of transferring network management information, so as to accommodate topology changes in a communications network comprising a plurality of network elements controlled by network element controllers and one or more network controllers, the or each network controller comprising a trail detection application, a trail route finder application and a trail manipulation application, wherein said method comprises the steps of:

representing the network as a plurality of layers, each said layer containing a plurality of trails and being represented by a respective layer network domain managed object describing that layer across the network, each said trail being represented by a respective trail managed object;

representing each trail as a plurality of sub-network connection managed objects;

storing a plurality of objects representing said network elements, said layer network domain managed objects and said trails;

for each said stored trail managed object representing a trail across said network, modifying a set of pointers of said trail managed object to point to a plurality of other said objects representing endpoints, connections and network elements for defining said trail; and manipulating and reconfiguring said trails in accordance with said modified trail object for implementing said trail in said network so as to perform stretch, split operations on said trails in response to the addition of elements to the network, and shrink and join operations on said trails in response to removal of elements from the network.

2. The method as claimed in claim 1, wherein said step of altering said pointers of said trail object to a plurality of end points comprises altering pointers to point to a set of sub-network connections which connect connection termination points and trail termination points.

3. The method as claimed in claim 1, wherein said step of altering said pointers of said trail object to a plurality of end points comprises altering pointers to point to a set of link connections which connect connection termination points.

4. The method as claimed in claim 1, wherein said step of altering said pointers of said trail object to a plurality of end points comprises altering pointers to point to a set of trail termination points.

5. A method of manipulating and reconfiguring a trail comprising a transport entity capable of transferring network management information and extending over a plurality of network elements in a communications network comprising a plurality of network elements controlled by network element controllers and one or more network controllers so as to install and manage a further network element in the network, and to incorporate that further network element in said trail by performing stretch and split operations on that trail, wherein said method comprises the steps of:

representing the network as a plurality of layers, each said layer containing a plurality of trails and being represented by a respective layer network domain managed object describing that layer across the network, each said trail being represented by a respective trail managed object;

representing each trail as a plurality of sub-network connection managed objects;

storing a plurality of objects representing said network elements, said layer network domain managed objects and said trails;

creating a first trail endpoint at said further network element;

creating a second trail endpoint at said further network element;

creating a sub-network connection between said first trail endpoint and said second trail endpoint at said further network element;

connecting a first link from a first of said plurality of network elements to said further network element; and connecting a second link between a second one of said plurality of network elements and said further network element.

6. A method of manipulating and reconfiguring trails in a communications network, each said trail comprising a transport entity capable of transferring network management information, so as to accommodate topology changes in a communications network comprising a plurality of network elements controlled via a plurality of network element controllers and one or more network controllers, each trail comprising a transport entity capable of transferring network management information, wherein before said reconfiguration, a first trail extends over first, second and third network elements in a network, and after said reconfiguration, said first trail extends between said first and third network elements and a new trail extends between said third network element and said second network element, wherein said method comprises the steps of:

representing the network as a plurality of layers, each said layer containing a plurality of trails and being represented by a respective layer network domain managed object describing that layer across the network, each said trail being represented by a respective trail managed object;

representing each trail as a plurality of sub-network connection managed objects;

storing a plurality of objects representing said network elements, said layer network domain managed objects and said trails;

disconnecting a pair of endpoints supporting said first trail at said third network element;

modifying said first trail on said third network element; and creating said new trail between said third network element and said second network element.

7. The method as claimed in claim 6, wherein said step of creating a new trail between said second network element and said third network element comprises utilising at least one end point and at least one sub-network connection of said first trail.

8. The method as claimed in claim 6, wherein said step of disconnecting a pair of endpoints at said third network element comprises disconnecting a sub-network connection from a connection termination point.

9. The method as claimed in claim 6, further comprising the step of for each of a plurality of client layer links supported by said first trail, setting a plurality of corresponding link termination point to said third network element.

10. The method as claimed in claim 6, further comprising the step of creating a plurality of client layer links extending over said second trail between said third and second network elements.

11. A method of manipulating and reconfiguring a trail comprising a transport entity capable of transferring communications network management information and extending over a plurality of network elements from a state in which said trail extends between a first network element and a second network element via a third network element, to a state in which said trail extends between said first and second network elements without traversing said third network element so as to perform shrink and join operations on said trail, said method comprising the steps of:

representing the network as a plurality of layers, each said layer containing a plurality of trails and being represented by a respective layer network domain managed object describing that layer across the network, each said trail being represented by a respective trail managed object;

representing each trail as a plurality of sub-network connection managed objects;

storing a plurality of objects representing said network elements, said layer network domain managed objects and said trails;

extending a first link connection initially extending between said first network element and said third network element to extend between said first network element and said second network element;

removing a plurality of end points at said third network element from said trail;

removing a sub network connection at said third network element from said trail; and removing a link connection between said third network element and said second network element from said trail.

12. A method of manipulating and reconfiguring trails each comprising a transport entity capable of transferring network management information and extending over a plurality of network elements in a communications network so as to accommodate a topology change in the network by performing stretch and split operations on said trails, wherein in an initial state, first and second trails extend between first and third network elements and third and second network elements respectively, and in a reconfigured state, said first trail extends between said first and second network elements via said third network element, said method comprising the steps of:

representing the network as a plurality of layers, each said layer containing a plurality of trails and being represented by a respective layer network domain managed object describing that layer across the network, each said trail being represented by a respective trail managed object;

representing each trail as a plurality of sub-network connection managed objects;

storing a plurality of objects representing said network elements, said layer network domain managed objects and said trails;

making a connection between an endpoint of said first trail at said third network element and an endpoint of said second trail at said second network element; and adding said connection to said third network element.

13. The method as claimed in claim 12, further comprising the step of removing an endpoint of said first trail at said third network element.

14. The method as claimed in claim 12, further comprising the step of deleting said second trail between said third node element and said second node element.

15. The method as claimed in claim 12, further comprising the step of adding a link connection between said third node and said second node to said third trail.

16. The method as claimed in claim 12, further comprising the step of defining a trail termination point for said first trail at said second node.

17. The method as claimed in claim 12, further comprising the step of adding a sub-network connection at said second node to said first trail.

18. The method as claimed in claim 12, further comprising the step of providing at least one client link between said first node and said second node.

19. The method as claimed in claim 12, further comprising the step of deleting a client link dependent on said second trail between said third and said second nodes.

* * * * *